Figure 1:
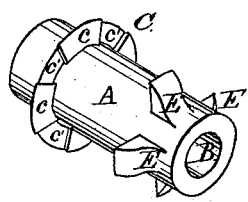

A. J. MANNY.
Rotary Colter.

No. 230,883. Patented Aug. 10, 1880.

WITNESSES:
Geo. H. Knight.
Walter Allen.

INVENTOR:
Abraham J. Manny
By Knight Bro.
Attys.

United States Patent Office.

ABRAHAM J. MANNY, OF ST. LOUIS, MISSOURI.

ROTARY COLTER.

SPECIFICATION forming part of Letters Patent No. 230,883, dated August 10, 1880.

Application filed February 9, 1880.

*To all whom it may concern:*

Be it known that I, ABRAHAM J. MANNY, of the city of St. Louis, in the State of Missouri, have invented a certain new and useful Improvement in Rotary Colters, of which the following is a full, clear, and exact description, reference being had to the accompanying drawings, forming part of this specification.

My improvement relates to that part of a rotary colter known as the "hub" or "axle."

Various devices have heretofore been used, one consisting of two collars, one of which is riveted to each side of the blade, and in or on each of which is formed a part of the axle-bearing. The difficulty of adjusting and riveting these collars so that the bearing of each should be in line with that of the other (which is necessary to prevent the bearings from wearing rapidly and the blade from wabbling) is a serious objection to their use. Numerous other devices have been used partially obviating these difficulties admitting readier and easier adjustment and replacement when worn, the hub, made in two parts with collar or disk on each, being screwed together, clamping the blade between them; but they require the use of more metal, and consequently weight and expense, in their construction. They are also liable to rattle loose and allow the blade to turn upon the hub and to wabble when first used, the bearing parts being all metal against metal, almost without any elasticity, and from the same cause it is difficult, and, in fact, impossible, without breakage, to remove or replace after the threads and bearing parts become rusted.

The first part of my improvement consists in making the hub in a single piece, requiring in its construction the minimum of material, weight, and expense, in which the bearing is always at right angles with the face of the blade, and on which any diameter or thickness of blade can be used without varying the length of the bearing, and which, being inserted and partially turned, is locked to the blade.

My improvement also relates to the angular recesses in the colter-hub to receive the projections of the blade or bracing disk or washer, to prevent the blade from turning upon the hub, and in which part of my improvement my invention is not confined to the form of hub shown in the drawings, which is made in one piece, having the hole for the axle bolt or spindle. These recesses are equally applicable to a hub constructed in any other form.

Figure 2:
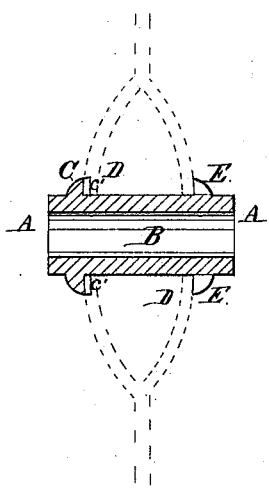

In the drawings, Figure 1 is a perspective view of a hub for rotary colters, illustrating my improvement. Fig. 2 is an axial section of same.

The main part A of the hub, as shown, consists of a cylinder or barrel having an axial bore, B, through which passes a pin or spindle, upon which it rotates. Said bore forms no part of my invention. The novel features of the hub are equally applicable to a hub having gudgeons at the ends.

C is a collar, whose inner face, c, may be about at a right angle with the axis, or more or less nearly approached thereto. In this collar are shown recesses c' to receive projections of the blade or colter, or to receive the points when the colter is radially slitted at the middle and the points turned out, as shown in dotted lines at D, Fig. 2.

E E are lugs in a circular series around the barrel of the hub, against which that side of the colter is supported. Thus the lugs E may be considered as a circumferential collar, notched through down to the barrel, to allow the passage of the inwardly-projecting points, which, by a partial rotation of the colter, are brought against the inner faces of the lugs E, to hold the colter upon that side.

The recesses c', when the colter is in the last-described position, receive the projections or points of the colter, to prevent the turning of the hub.

I do not confine myself to the one-piece hub in combination with any particular form or forms of rotary colters; nor do I confine myself in the matter of the distance asunder of the collar C and the lugs E. They may be just far enough asunder to admit the colter-plate between them, and projections may be formed on the plate to enter the recesses c and prevent the colter-plate from turning, for the purpose hereinbefore stated; or the collar C and lugs E may be a sufficient distance asunder to admit one or two supporting washers or disks besides the colter-plate.

Fig. 2 shows by dotted lines one form of colter-blade adapted to be used with my improved hub. This blade has radial slits in its central portion, and the thus divided parts are bent outward so as to form diverging legs, which may be easily slipped between the lugs E, and then, with a slight turn, caused to engage in recesses $c'$ and behind the said lugs E, thereby locking the disk securely in position. This colter-disk, however, I do not wish to claim here, as I have made it the subject of a separate application for Letters Patent.

I claim as my invention—

1. In a rotary colter, the combination, with a colter-blade, of the self-locking hub with projection or projections at each side of the blade, cast in one piece with the hub, substantially as and for the purpose set forth.

2. The combination, with the collar C, having the recesses $c'$ on its inner face, of the lugs or notched collar E, cast in one piece with the hub and collar C, substantially as and for the purpose set forth.

3. In a rotary colter, the combination, with the collar on the hub at either side of the blade with recesses in or projections on its face, of the blade with corresponding projections on or recesses in its face, substantially as and for the purpose set forth.

ABRAHAM J. MANNY.

Witnesses:
SAML. KNIGHT,
GEO. H. KNIGHT.